US012764817B2

(12) United States Patent
Panzner et al.

(10) Patent No.: US 12,764,817 B2
(45) Date of Patent: Oct. 13, 2026

(54) TRIANGULAR INTER-USER EQUIPMENT COORDINATION FOR NEW RADIO SIDELINK COMMUNICATIONS

(71) Applicant: Nokia Technologies Oy, Espoo (FI)

(72) Inventors: Berthold Panzner, Munich (DE); Prajwal Keshavamurthy, Munich (DE); Stepan Kucera, Munich (DE); Taylan Sahin, Munich (DE)

(73) Assignee: Nokia Technologies Oy, Espoo (FI)

(*) Notice: Subject to any disclaimer, the term of this patent is extended or adjusted under 35 U.S.C. 154(b) by 356 days.

(21) Appl. No.: 18/485,815

(22) Filed: Oct. 12, 2023

(65) Prior Publication Data

US 2024/0129981 A1 Apr. 18, 2024

Related U.S. Application Data

(60) Provisional application No. 63/416,348, filed on Oct. 14, 2022.

(51) Int. Cl.
*H04W 76/15* (2018.01)
*H04W 72/40* (2023.01)

(52) U.S. Cl.
CPC .......... *H04W 76/15* (2018.02); *H04W 72/40* (2023.01)

(58) Field of Classification Search
CPC .............................. H04W 76/15; H04W 72/40
USPC .......................................................... 370/329
See application file for complete search history.

(56) References Cited

U.S. PATENT DOCUMENTS

| | | | | |
|---|---|---|---|---|
| 11,343,195 | B1 * | 5/2022 | Kolev | H04L 65/1069 |
| 11,791,943 | B2 * | 10/2023 | Rico Alvarino | H04L 1/1861 370/329 |
| 2013/0097335 | A1 * | 4/2013 | Jiang | H04L 69/22 709/245 |
| 2018/0270715 | A1 * | 9/2018 | Lee | H04L 12/4633 |

(Continued)

FOREIGN PATENT DOCUMENTS

| | | |
|---|---|---|
| WO | 2021/231091 A1 | 11/2021 |
| WO | 2022/115979 A1 | 6/2022 |
| WO | 2022/147228 A1 | 7/2022 |

OTHER PUBLICATIONS

"WID revision: NR sidelink enhancement", 3GPP TSG RAN Meeting #90e, RP-202846, Agenda: 9.8.3, LG Electronics, Dec. 7-11, 2020, 6 pages.

(Continued)

*Primary Examiner* — Angel T Brockman
(74) *Attorney, Agent, or Firm* — Robert P. Michal, Esq.; Rimon PC

(57) ABSTRACT

Triangular inter-user equipment coordination for new radio sidelink communications is provided. An exemplary apparatus may include at least one processor, and at least one memory. The memory stores instructions that, when executed by the processor, may cause the apparatus at least to receive, from a first device, a request of inter-user equipment coordination. The apparatus may also be caused to determine at least one second device to which to forward the request. The apparatus may also be caused to modify the request and forward the modified request to the at least one second device for the second device to provide a response to the request to the first device. The request may be modified by an indication related to the forwarding to the at least one second device.

1 Claim, 4 Drawing Sheets

(56) References Cited

U.S. PATENT DOCUMENTS

| | | | |
|---|---|---|---|
| 2020/0314808 | A1 | 10/2020 | Nguyen et al. |
| 2022/0225288 | A1 | 7/2022 | Park |

OTHER PUBLICATIONS

"Feature lead summary #6 for AI 8.11.1.2 Inter-UE coordination for Mode 2 enhancements", 3GPP TSG RAN WG1 Meeting #108-e, R1-2202665, Agenda: 8.11.1.2, LG Electronics, Feb. 21-Mar. 3, 2022, pp. 1-63.

"Reliability and Latency Enhancements for Mode 2", 3GPP TSG RAN WG1 Meeting #103-e, R1-2009273, Agenda: 8.11.2.2, Qualcomm Incorporated, Oct. 26-Nov. 13, 2020, 19 pages.

* cited by examiner

TRIANGULAR INTER-USER EQUIPMENT COORDINATION FOR NEW RADIO SIDELINK COMMUNICATIONS

TECHNICAL FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for triangular inter-user equipment (UE) coordination for NR sidelink communications.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

In various exemplary embodiments, the apparatus may include at least one processor, and at least one memory storing instructions. The instructions, when executed by the at least one processor, may cause the apparatus at least to receive, from a first device, a request of inter-user equipment coordination, and determine at least one second device to which to forward the request. The apparatus may also be caused to modify the request and forward the modified request to the at least one second device for the second device to provide a response to the request to the first device. The request may be modified by an indication related to the forwarding to the at least one second device.

In various exemplary embodiments, the apparatus may include at least one processor, and at least one memory storing instructions. The instructions, when executed by the at least one processor, may cause the apparatus at least to provide, to a first device, a request of inter-user equipment coordination, which may include a latency period, and receive, from a second device, a response to the request, the response comprising transmission parameters associated with the first device.

In various exemplary embodiments, the apparatus may include at least one processor, and at least one memory storing instructions. The instructions, when executed by the at least one processor, may cause the apparatus at least to receive, from a first device, a forwarded request of inter-user equipment coordination. The request may include an indication associated with the first device and a second device, which previously provided an initial request by a transmission to the first device. The forwarded request may include the initial request.

In certain exemplary embodiments, the apparatus may include a receiving means for receiving, from a first device, a request of inter-user equipment coordination, and a first determining means for determining at least one second device to which to forward the request. The apparatus may also include a modifying means for modifying the request and forward the modified request to the at least one second device for the second device to provide a response to the request to the first device. The request may be modified by an indication related to the forwarding to the at least one second device.

In certain exemplary embodiments, the apparatus may include a providing means for providing, to a first device, a request of inter-user equipment coordination, the request comprising a latency period. The apparatus may also include a receiving means for receiving, from a second device, a response to the request, the response comprising transmission parameters associated with the first device.

In certain exemplary embodiments, the apparatus may include a receiving means for receiving, from a first device, a forwarded request of inter-user equipment coordination. The request may include an indication associated with the first device and a second device, which previously provided an initial request by a transmission to the first device. The forwarded request may include the initial request. The apparatus may include a providing means for providing, to the second device, a response to the forwarded request using transmission parameters associated with the transmission from the second device to the first device.

In some exemplary embodiments, a method may be provided including processes of receiving, from a first device, a request of inter-user equipment coordination, and determining at least one second device to which to forward the request. The method may also include modifying the request and forward the modified request to the at least one second device for the second device to provide a response to the request to the first device. The request may be modified by an indication related to the forwarding to the at least one second device.

In some exemplary embodiments, a method may be provided including processes of providing, to a first device, a request of inter-user equipment coordination, the request comprising a latency period, and receiving, from a second device, a response to the request, the response comprising transmission parameters associated with the first device.

In some exemplary embodiments, a method may be provided including processes of receiving, from a first device, a forwarded request of inter-user equipment coordination. The request may include an indication associated with the first device and a second device, which previously provided an initial request by a transmission to the first device. The forwarded request may include the initial request.

In various exemplary embodiments, a non-transitory computer readable storage medium may store instructions that, when executed by at least one processor of an apparatus, causes the apparatus to perform processes that include receiving, from a first device, a request of inter-user equipment coordination. The apparatus may also be caused to determine at least one second device to which to forward the request, and modify the request and forward the modified request to the at least one second device for the second device to provide a response to the request to the first device.

The request may be modified by an indication related to the forwarding to the at least one second device.

In various exemplary embodiments, a non-transitory computer readable storage medium may store instructions that, when executed by at least one processor of an apparatus, causes the apparatus to perform processes that include providing, to a first device, a request of inter-user equipment coordination. The request may include a latency period. The apparatus may also be caused to receive, from a second device, a response to the request. The response may include transmission parameters associated with the first device.

In various exemplary embodiments, a non-transitory computer readable storage medium may store instructions that, when executed by at least one processor of an apparatus, causes the apparatus to perform processes that include receiving, from a first device, a forwarded request of inter-user equipment coordination. The request may include an indication associated with the first device and a second device, which previously provided an initial request by a transmission to the first device. The forwarded request may include the initial request. The apparatus may also be caused to provide, to the second device, a response to the forwarded request using transmission parameters associated with the transmission from the second device to the first device.

In various exemplary embodiments, a computer program may be provided to perform at least one of the methods described herein. Further, certain exemplary embodiments may provide circuitry configured to perform at least one of the methods described herein.

BRIEF DESCRIPTION OF THE DRAWINGS

For proper understanding of example embodiments, reference should be made to the accompanying drawings, as follows.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and non-transitory computer program products for triangular inter-UE coordination for NR sidelink communications.

In 5G NR, direct device-to-device communications, such as UE to UE, V2V, V2X, and the like, may be referred to as sidelink (SL) communications. NR SL communications may be performed by unicast, groupcast, and broadcast. In unicast, a device, such as a UE, may target communications directly to a specific receiving device to receive the communications. In groupcast, the UE may target a group of receiving devices to receive the communications. In broadcast, the UE may target any and all devices that may be within a range of transmission relative to the UE.

As part of sidelink transmissions, the devices, such as UEs, may inter-coordinate with each other to determine resource information and allocation for the sidelink transmission. This procedure may be referred to as inter-UE-Coordination (IUC). As part of the IUC procedure, a first UE may transmit a request, referred to as IUCRequest, to a second UE by unicast communication. The second UE may provide a response, which may be in the form of an IUCInformation message, to the first UE. The response from the second UE may include information related to resource allocation and/or channel information. Alternatively, the second UE may ignore the IUCRequest from the first UE. For example, the second UE may ignore the IUCRequest when the second UE does not have any sensing results. As another example, the second UE may ignore the IUCRequest when sensing results for a resource selection window (RSW) $[n+T_1,n+T_2]$, which is indicated by the IUCRequest. The second UE may ignore the IUCRequest by not sending any response, such as IUCInformation, to the first UE.

By ignoring the IUCRequest and not providing a response to the IUCRequest to the first UE, long delays and poor system efficiency may occur, which may be unacceptable for safety-critical applications. Such a delay may cause a latency budget of a planned transmission of the first UE's data (e.g., transport block) to expire without any transmission because no IUCInformation has been received by the first UE within the timeframe defined by the latency budget.

Figure 1:
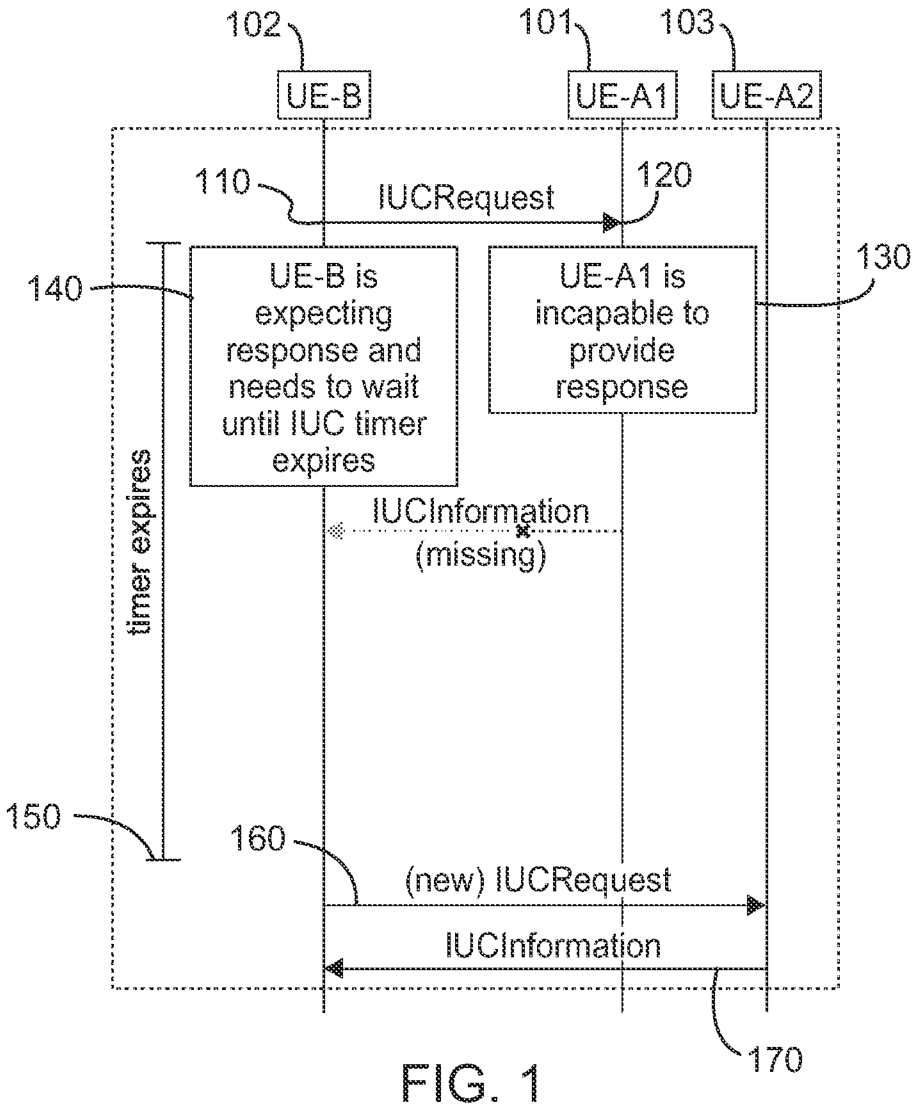
FIG. 1 illustrates an example of inter-user equipment (UE) coordination using two UEs.

FIG. 1 illustrates an example of an IUC procedure in which a UE, referred to an UE-A1 101, ignores or otherwise fails to response to an IUCRequest from another UE, which is referred to as UE-B 102. At 110, UE-B 102 may perform at least a portion of an IUC procedure by sending an IUCRequest to UE-A1 101. The IUCRequest may be sent by unicast transmission. At 120, UE-A1 101 may receive the IUCRequest from UE-B 102. At 130, UE-A1 101 may ignore the IUCRequest and/or may determine that UE-A1 101 is incapable of providing a response.

At 140, after sending the IUCRequest to UE-A1 101, an IUC timer may clock a set time period in which UE-B 102 may be waiting and expecting a response to the IUCRequest. At 150, the set time period of the IUC timer may expire without receiving a response to the IUCRequest. The IUC timer may be set by sl-LatencyBoundIUC-Report ranging from 3 to 160 slots. At 160, UE-B 102 may send a new IUCRequest to another UE, which is referred to as UE-A2 103. UE-B 102 may be limited by the IUC timer, such that UE-B 102 may not be allowed to send a new IUCRequest until the IUC timer expires. At 170, UE-A2 103 provides a response to the IUCRequest within a time period set by the IUC timer for the new IUCRequest. The response may include, for example, IUCInformation.

In this example illustrated in FIG. 1 in which UE-A1 101 does not provide any response, such as IUCInformation, to UE-B 102, UE-B 102 may be forced to wait until the IUC timer expires before UE-B 102 may send a new IUCRequest to another UE-A2 103. It may be advantageous to reduce this delay and increase the efficiency of the system.

As discussed in detail below, various exemplary embodiments may provide several technical improvements, enhancements, and/or advantages including, for example, establishing an improved IUC scheme that may include at least one additional UE to form a so-called triangular IUC scheme. This improved triangular IUC scheme may reduce the delay in the IUC procedure and may increase the efficiency of sidelink communications.

Figure 2:
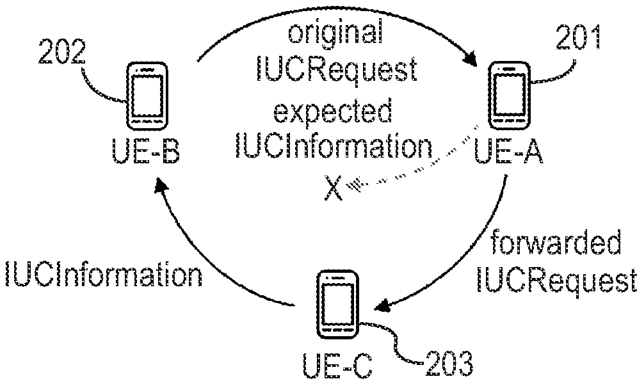
FIG. 2 illustrates an example of a configuration of UEs using triangular inter-UE coordination according to various exemplary embodiments.
Figure 7:
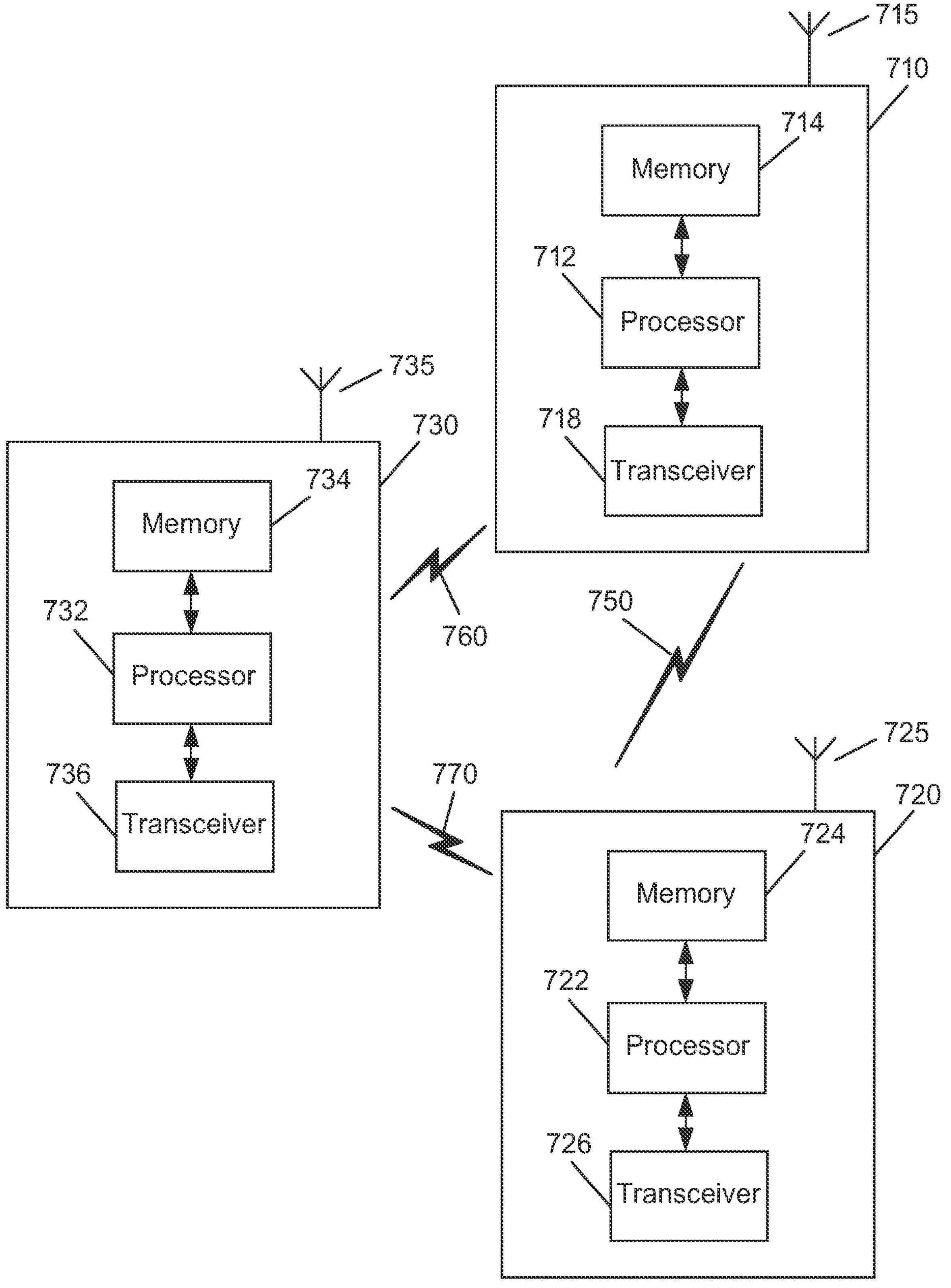
FIG. 7 illustrates a set of apparatuses according to some exemplary embodiments.

FIG. 2 illustrates an example of a triangular IUC scheme according to various exemplary embodiments. The triangular IUC scheme may involve at least three UEs. In some example embodiments, UE-A 201, UE-B 202, and UE-C 203 may be similar to apparatus 710, apparatus 720, and apparatus 730, respectively, as illustrated in FIG. 7.

A first UE, referred to as UE-B 202, may initiate an IUC procedure and send an IUCRequest to a second UE, which is referred to as UE-A 201. The UE-A 201 may determine that the UE-A 201 is incapable of providing a response to the IUCRequest, and/or otherwise determines not to provide a response to the IUCRequest.

The UE-A 201 may determine that the UE-A 201 is incapable of providing a response to the IUCRequest based on, for example, missing sensing capabilities and/or missing sensing results. In NR SL, sensing may be performed by a UE determining and/or selecting a set of resources to be used for sidelink transmission. According to various exemplary embodiments, the UE-A 201 may determine that the UE-A 201 may not have sensing results from a sensing procedure, or may not have sensing results for a resource selection window (RSW) $[n+T_1,n+T_2]$, which is indicated by the UE-B 202 in the IUCRequest.

The lack of sensing results so that the UE-A 201 may not provide a response to the IUCRequest may be due to one or multiple factors. For instance, the UE-A 201 may not have the capability to perform sensing/resource exclusion, and/or the UE-A 201 may be a reduced capability (RedCap) device, which may not monitor a full SL carrier. Further, the UE-A 201 may be configured with an SL discontinuous reception (SL-DRX) configuration, and/or the UE-A 201 may have limited battery power, which causes the UE-A 201 to not perform sensing or to perform partial sensing. In addition, or alternatively, the UE-A 201 may have been recently (e.g., within a pre-set time period) powered on such that sensing results and/or sensing capabilities may not be available.

The UE-A 201 may then send/forward the IUCRequest to one or more other UEs. For example, as shown in FIG. 2, the UE-A 201 may forward the IUCRequest, which was received from the UE-B 202, to UE-C 203. The UE-C 203 is another UE that may be capable of providing a response to the IUCRequest. Although UE-C 203 may be used in the various exemplary embodiments described herein, the exemplary embodiments are not limited to UE-C 203 and the description herein may apply to any one or more suitable other UEs.

In various exemplary embodiments, the UE-A 201 may determine/select the one or more other UEs, which includes, for example, UE-C 203, using one or more defined criteria. For instance, UE-A 201 may consider one or more of: a distance between UE-A 201 and UE-C 203 (e.g., a shorter distance between UE-A 201 and UE-C 203 is favoured), a mobility (e.g., trajectory and/or velocity) of UE-A 201 and UE-C 203, and the capabilities of UE-C 203, a type of UE-C 203 (e.g., a road side unit), a similarity in the occurrence of interference at UE-A 201 and UE-C 203, a pre-existing and/or ongoing communication between UE-A 201 and UE-C 203, an explicit consent from UE-C 203 for a request from UE-A 201, and/or an explicit recommendation of UE-C 203 to UE-A 201 from UE-B 202, the road side unit, and/or a network entity, such as a gNB. In these above criteria, UE-C 203 is used for exemplary purposes only, and the criteria may apply to any of the one or more other UEs. The various exemplary embodiments are not limited to these above criteria, and may include additional and/or alternative criteria to select and/or determine the one or more other UEs (e.g., UE-C 203).

In various exemplary embodiments, the UE-A 201 may modify the IUCRequest and/or add additional information to the IUCRequest before sending the IUCRequest to the one or more other UEs, such as the UE-C 203 as used in the example described herein. The UE-A 201 may add or associate in the transmission at least one indication or other information element in the forwarded IUCRequest. The indication may be one or more of the following: a flag/indication to signal an inability of the UE-A 201 to provide IUCInformation in response to the IUCRequest from the UE-B 202, a flag/indication to signal that the IUCRequest is forwarded and originates from another UE, a source layer 2 (L2) identifier (ID) of the UE-B 202 that was used in the original IUCRequest sent from UE-B 202, the destination L2-ID of UE-A 201 used in the original IUCRequest sent from UE-B 202, and a flag/indication to signal that the UE-C 203 may use transparent mode such that the UE-C 203 transmits the IUCInformation on behalf of the UE-A 202 using provided L2-IDs.

In certain exemplary embodiments, the UE-A 201 may inform the UE-B 202 that the IUCRequest has been and/or may be forwarded to the one or more other UEs, such as the UE-C 203. The UE-B 202 may, for example, change the expiry time of an IUC timer in order to provide more time for the UE-C 203 to send an IUCInformation message in response to the IUCRequest. For example, the expiry time of the IUC timer may be increased/prolonged to provide the additional time for the UE-C 203 to send an IUCInformation message.

After the UE-C 203 receives the forwarded IUCRequest from the UE-B 202, the UE-C 203 may provide a response (e.g., an IUCInformation message) to the UE-B 202, which may include IUCInformation. This improved IUC scheme provided by various exemplary embodiments may allow the UE-C 203 to, in effect, respond to the IUCRequest originally sent to the UE-A 201, and thus the UE-B 202 may timely receive the response from UE-C 203, which may include the IUCInformation, before the expiry of a time period set by the IUC timer.

According the some exemplary embodiments, the UE-C 203 may not have been previously known by the UE-B 202, which may be referred to as the UE-C 203 operating in a transparent mode. This lack of a restriction on which UEs may provide a response with the IUCInformation may increase the efficiency of the system and the IUC procedure.

Figure 3:
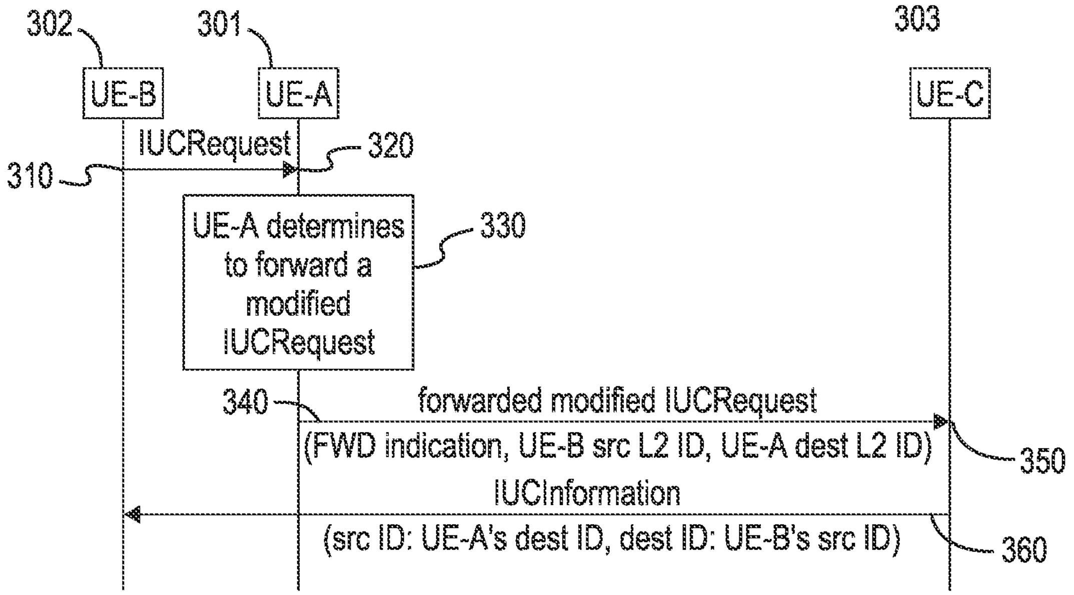
FIG. 3 illustrates a flow diagram for signal processing flow for triangular inter-UE coordination according to certain exemplary embodiments.

FIG. 3 illustrates a signal flow for triangular inter-user equipment (UE) coordination for NR sidelink communications according to various exemplary embodiments. In some example embodiments, UE-A 301, UE-B 302, and UE-C 303 may be similar to apparatus 710, apparatus 720, and apparatus 730, respectively, as illustrated in FIG. 7.

At 310, the UE-B 302 transmits an IUCRequest to the UE-A 301 to initiate an IUC procedure. The IUCRequest may provide a latency period or otherwise pre-set time period in which the UE-A 301 may be expected to provide a response to the IUCRequest, which may include IUCInformation.

At 320, the UE-A 301 may receive the IUCRequest from the UE-B 302, and at 330, the UE-A 301 may determine whether to forward the IUCRequest to one or more additional UEs, such as UE-C 303. The UE-A 301 may determine to forward the IUCRequest upon or after determining that the UE-A 301 may have an inability, either temporarily or permanently, to respond to the IUCRequest, which may include the IUCInformation. The temporary inability to provide the response to the IUCRequest may be an inability to respond within the latency period. Prior to forwarding the IUCRequest, the UE-A 301 may modify the IUCRequest in various ways, such as by adding or associating an indicator to the IUCRequest. The modified IUCRequest may include, for example, a flag/indication that the IUCRequest is forwarded from UE-A 301, UE-B's source layer 2 (L2) identifier (ID), UE-A's destination L2 ID, and the like, as discussed in detail above.

At 340, the UE-A 301 may forward the IUCRequest, which may be modified, to the UE-C 303. At 350, the UE-C 303 may receive the IUCRequest, and at 360, may provide a response to the UE-B 302, which may include the IUCInformation. The response and/or IUCInformation may include at least the destination ID of UE-A 301 and/or the UE-B source ID.

Although the IUCRequest may be provided by unicast transmission from UE-B 302, in certain exemplary embodiments the UE-A 301 may change the cast-type for the forwarded (and modified) IUCRequest from unicast to another cast type, such as groupcast or broadcast. In some exemplary embodiments, the UE-A 301 may not be aware of the UE-C 303 in a vicinity of UE-A 301, and thus the UE-A 302 may forward the IUCRequest by groupcast or broadcast restricted to recipients within a configurable range. The configurable range may be a distance between the one or more UE-Cs (e.g., UE-C 303) and UE-A 301.

According to various exemplary embodiments, the UE-A 301 may forward the IUCRequest to multiple UE-Cs by at least one of multiple unicast, groupcast or broadcast. The UE-A 301 may add at least one indication on the conditions under which one of the UE-Cs, such as UE-C 303, may provide IUCInformation to the UE-B 302 on behalf of the UE-A 301.

According to some exemplary embodiments, the conditions may include a minimum SL reference signal received power (RSRP) threshold and/or a maximum distance threshold for the SL RSRP and/or distance, respectively, observed at the UE-C 303 relative to the UE-A 301. This may allow the UE-C 303, which has similar radio conditions as the UE-A 301, to respond to the UE-B 302. Further, different RSRP thresholds and distance thresholds with an associated response time interval may be provided to the one or more other UEs, such as the UE-C 303, such that the UE-C 303 with a higher SL RSRP/lower distance may respond at an earlier time interval. The UE-C 303, which may satisfy the RSRP threshold, may provide IUCInformation in the associated time interval when no other UE provided the IUCInformation in the previous time intervals.

According to some exemplary embodiments, the UE-C 303 that may receive a broadcast/groupcast transmission of the forwarded IUCRequest may start a random backoff timer (e.g., pre-configured by the network) before processing the IUCRequest, so as to potentially avoid multiple UEs responding at the same time and repeating the same procedure.

An example implementation according to various exemplary embodiments may involve vehicle to anything (V2X). An example may be utilized for a vehicular UE-B, such as the UE-B 302, requesting resource recommendations from a battery-powered pedestrian/wearable UE-A, such as UE-A 301, in a collision prevention application. Although the UE-A might be interested to provide requested IUCInformation in response to a request from the UE-B, the UE-A is temporarily not capable of providing the IUCInformation. A third UE, such as UE-C 303, which may be an RSU with local full time sensing in the vicinity of the UE-A, may be forwarded the request from the UE-A to provide the IUCInformation directly to the UE-B.

Figure 4:
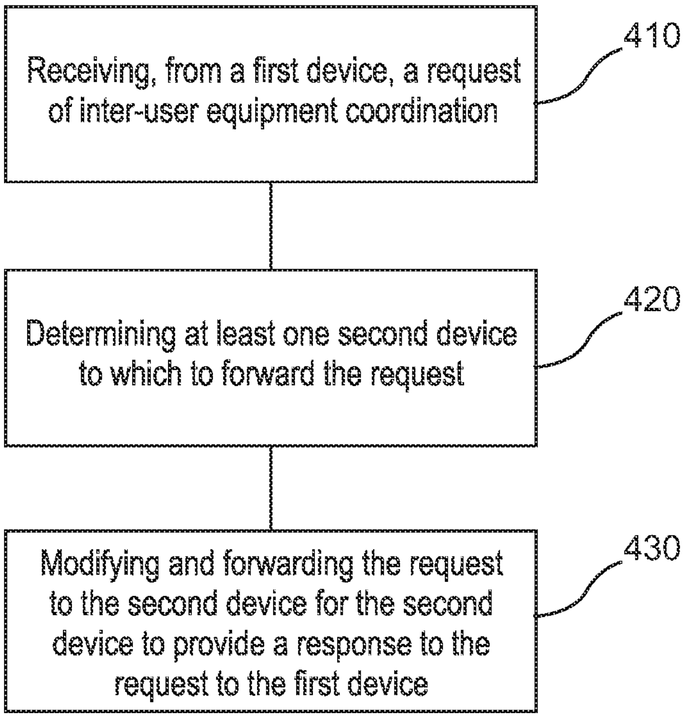
FIG. 4 illustrates an example of a flow diagram of a method according to various exemplary embodiments.

FIG. 4 illustrates an example flow diagram of a method, according to certain example embodiments. In an example embodiment, the method of FIG. 4 may be performed by a network element, or a group of multiple network elements in a 3GPP system, such as LTE or 5G-NR. For instance, in an example embodiment, the method of FIG. 4 may be performed by a UE, RedCap UE, SL UE, or the like, which is similar to apparatus 710 illustrated in FIG. 7.

According to various exemplary embodiments, the method of FIG. 4 may include, at 410, receiving, from a first device similar to apparatus 720, a request of inter-user equipment coordination. At 420, the method may further include determining at least one second device to which to forward the request. The second device may be similar to apparatus 730. At 430, the method may also include modifying the request and forwarding the modified request to the at least one second device for the second device to provide a response to the request to the first device. In certain exemplary embodiments, the request may be modified by an indication related to the forwarding to the at least one second device.

According to various exemplary embodiments, the method may further include, at 440, determining an inability of the apparatus 710 to provide a response to the first device that responds to the request.

According to some exemplary embodiments, the request from the first device may include a latency period during which the first device requests to receive a response to the request. In certain exemplary embodiments, the determined inability may be a temporary inability to provide the response to the request to satisfy the latency period included in the request from the first device. Alternatively, in other exemplary embodiments, the determined inability may be a permanent inability to provide the response to the request.

According to some exemplary embodiments, determining the at least one second device may be based on at least one of: a distance between the apparatus and the at least one second device, a mobility of the apparatus relative to the at least one second device, one or more capabilities of the at least one second device, a type of the at least one second device, a similarity in an interference situation of the apparatus and the at least one second device, a communication state between the apparatus and the at least one second device, explicit consent from the at least one second device to receive requests from the apparatus, and/or an explicit recommendation of the at least one second device to the apparatus from another device.

According to certain exemplary embodiments, the indication may include one or more of: transmission information indicating identifiers of the apparatus and the first device, information indicating the inability of the apparatus to provide the response to the request from the first device, and/or information indicating that the modified request was forwarded from the apparatus to the at least one second device.

According to certain exemplary embodiments, at 450, the method may further include determining to change a cast transmission type of the request to be forwarded. In certain exemplary embodiments, the cast transmission type may include one of unicast, groupcast, or broadcast. In other exemplary embodiments, the forwarding of the modified request may use the changed cast transmission type, which may be different than the cast transmission type used to transmit the request from the first device.

Figure 5:
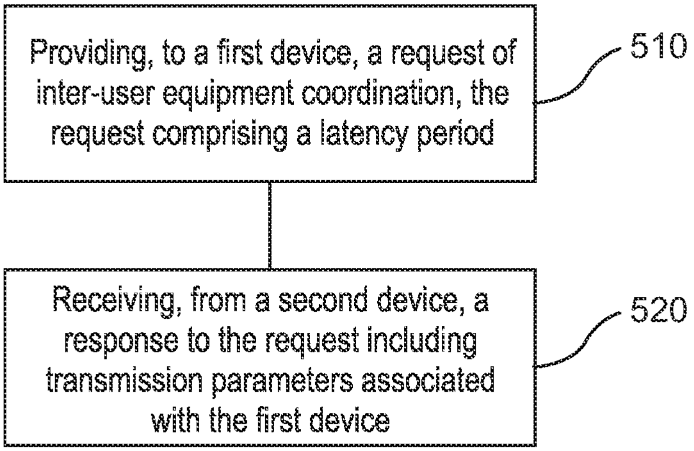
FIG. 5 illustrates another example of a flow diagram of a method according to various exemplary embodiments.

FIG. 5 illustrates an example of a flow diagram of another method, according to certain example embodiments. In an example embodiment, the method of FIG. 5 may be performed by a network element, or a group of multiple network elements in a 3GPP system, such as LTE or 5G-NR. For instance, in an example embodiment, the method of FIG. 5 may be performed by a UE, RedCap UE, SL UE, or the like, which is similar to apparatus 720 illustrated in FIG. 7.

According to various exemplary embodiments, the method of FIG. 5 may include, at 510, providing, to a first device similar to apparatus 710, a request of inter-user equipment coordination. The request may include a latency period. The method may further include, at 520, receiving, from a second device similar to apparatus 730, a response to the request, the response including transmission parameters associated with the first device.

According to some exemplary embodiments, the response from the second device may include information requested from the first device in the request.

According to some exemplary embodiments, the latency period may be a time period in which the apparatus requests to receive the response to the request. In some exemplary embodiments, the first device may be determined to have a temporary inability to provide the response to the request to satisfy the latency period included in the request. Alternatively, in other exemplary embodiments, the first device may be determined to have a permanent inability to provide the response to the request.

According to certain exemplary embodiments, the at least one second device may satisfy at least one criteria of: a distance between the first device and the second device, a mobility of the first device relative to the second device, one or more capabilities of the second device, a type of the second device, a similarity in an interference situation of the first device and the second device, a communication state between the first device and the second device, explicit consent from the second device to receive requests from the first device, and/or an explicit recommendation of the second device to the first device from the apparatus.

Figure 6:
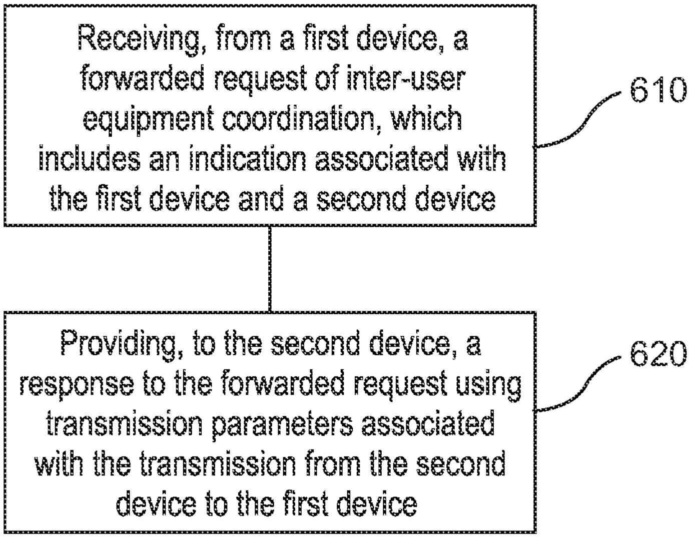
FIG. 6 illustrates a further example of a flow diagram of a method according to some exemplary embodiments.

FIG. 6 illustrates an example of a flow diagram of another method, according to certain example embodiments. In an example embodiment, the method of FIG. 6 may be performed by a network element, or a group of multiple network elements in a 3GPP system, such as LTE or 5G-NR. For instance, in an example embodiment, the method of FIG. 6 may be performed by a UE, RedCap UE, SL UE, or the like, which is similar to apparatus 730 illustrated in FIG. 7.

According to various exemplary embodiments, the method of FIG. 6 may include, at 610, receiving, from a first device similar to apparatus 710, a forwarded request of inter-user equipment coordination. In certain exemplary embodiments, the request may include an indication associated with the first device and a second device similar to apparatus 720, which previously provided an initial request by a transmission to the first device. In certain exemplary embodiments, the forwarded request may include the initial request. At 620, the method may further include providing, to the second device, a response to the forwarded request using transmission parameters associated with the transmission from the second device to the first device.

According to some exemplary embodiments, the forwarded request may include an indication of an inability of the first device to provide a response to the initial request to the second device.

According to certain exemplary embodiments, the forwarded request may include a latency period during which the second device requests to receive a response to the initial request. In some exemplary embodiments, the inability may be a temporary inability to provide the response to the initial request to satisfy the latency period included in the initial request. Alternatively, in other exemplary embodiments, the determined inability may be a permanent inability to provide the response to the initial request.

According to certain exemplary embodiments, the apparatus 730 may satisfy a criteria relative to the first device of at least one of: a distance between the apparatus and the first device, a mobility of the apparatus relative to first device, one or more capabilities of the apparatus, a type of the apparatus, a similarity in an interference situation of the apparatus and the first device, a communication state between the apparatus and the first device, explicit consent from the apparatus to receive requests from the first device, and/or an explicit recommendation of the apparatus from the second device.

According to various exemplary embodiments, the indication may further include one or more of transmission information indicating identifiers of the apparatus and the first device, and/or information indicating that the modified request was forwarded from the apparatus to the at least one second device.

According to some exemplary embodiments, the forwarded request may be received from the first device by a cast transmission type that is different than a cast transmission type that transmitted the initial request from the second device to the first device. In other exemplary embodiments, the cast transmission types may be selected from the group including unicast, groupcast, or broadcast.

According to some exemplary embodiments, the response to the forwarded request is provided by transmitting, by the apparatus to the second device, the response to the forwarded request.

Various exemplary embodiments described herein may provide several technical improvements, enhancements, and/or advantages. For instance, some exemplary embodiments may provide an improved IUC scheme that may include at least one additional UE to form a so-called triangular IUC scheme. This improved triangular IUC scheme may reduce the delay in the IUC procedure and may increase the efficiency of sidelink communications.

FIG. 7 illustrates a set of apparatuses 710, 720, and 730 according to various exemplary embodiments. In the various exemplary embodiments, the apparatuses 710, 720, and 730 may respectively be an element in a communications network or associated with such a network, such as a UE, mobile equipment (ME), mobile station, mobile device, stationary device, IoT device, or similar other device. It should be noted that one of ordinary skill in the art would understand that apparatuses 710, 720, and 730 may include components or features not shown in FIG. 7.

In some example embodiments, an apparatus (e.g., apparatuses 710, 720, and/or 730) may include means for performing a method, a process, or any of the variants discussed herein. Examples of the means may include one or more processors, memory, controllers, transmitters, receivers, and/or computer program code for causing the performance of the operations.

In some example embodiments, apparatuses 710, 720, and/or 730 may include one or more processors, one or more computer-readable storage medium (for example, memory, storage, or the like), one or more radio access components (for example, a modem, a transceiver, or the like), and/or a user interface. In some example embodiments, apparatuses 710, 720, and/or 730 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 7, apparatuses 710, 720, and/or 730 may include or be coupled to processors 712, 722, and 732 respectively, for processing information and executing instructions or operations. Processors 712, 722, and 732 may be any type of general or specific purpose processor. In fact, processors 712, 722, and 732 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 712 (and 722 and 732) for each of apparatuses 710, 720, and/or 730 is shown in FIG. 7, multiple processors may be utilized according to other example embodiments. For example, it should be understood that, in certain example embodiments, apparatuses 710, 720, and/or 730 may include two or more processors that may form a multiprocessor system (e.g., in this case processors 712, 722, and 732 may represent a multiprocessor) that may support multiprocessing. According to certain example embodiments, the multiprocessor system may be tightly coupled or loosely coupled (e.g., to form a computer cluster).

Processors 712, 722, and 732 may perform functions associated with the operation of apparatuses 710, 720, and/or 730, respectively, including, as some examples, precoding of antenna gain/phase parameters, encoding and decoding of individual bits forming a communication message, formatting of information, and overall control of the apparatuses 710, 720, and/or 730, including processes illustrated in FIGS. 2-6.

Apparatuses 710, 720, and/or 730 may further include or be coupled to memory 714, 724, and 734 (internal or external), respectively, which may be coupled to processors 712, 722, and 732, respectively, for storing information and instructions that may be executed by processors 712, 722, and 732. Memory 714 (and memory 724 and 734) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 714 (and memory 724 and 734) can be comprised of any combination of random access memory (RAM), read only memory (ROM), static storage such as a magnetic or optical disk, hard disk drive (HDD), or any other type of non-transitory machine or computer readable media. The instructions stored in memory 714, memory 724, and memory 734 may include program instructions or computer program code that, when executed by processors 712, 722, and 732, enable the apparatuses 710, 720, and/or 730 to perform tasks as described herein.

In certain example embodiments, apparatuses 710, 720, and/or 730 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 712, 722, and 732 and/or apparatuses 710, 720, and/or 730 to perform any of the methods illustrated in FIGS. 2-6.

In some exemplary embodiments, apparatuses 710, 720, and/or 730 may also include or be coupled to one or more antennas 715, 725, and 735, respectively, for receiving a downlink signal and for transmitting via an uplink from apparatuses 710, 720, and/or 730. Apparatuses 710, 720, and/or 730 may further include transceivers 716, 726, and 736, respectively, configured to transmit and receive information. The transceivers 716, 726, and 736 may also include a radio interface (e.g., a modem) respectively coupled to the antennas 715, 725, and 735. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceivers 716, 726, and 736 may be respectively configured to modulate information on to a carrier waveform for transmission by the antenna(s) 715, 725, and 735, and demodulate information received via the antenna(s) 715, 725, and 735 for further processing by other elements of apparatuses 710, 720, and/or 730. In other example embodiments, transceivers 716, 726, and 736 may be capable of transmitting and receiving signals or data directly. Additionally or alternatively, in some example embodiments, apparatuses 710, 720, and/or 730 may include an input and/or output device (I/O device). In certain example embodiments, apparatuses 710, 720, and/or 730 may further include a user interface, such as a graphical user interface or touchscreen.

In certain example embodiments, memory 714, memory 724, and memory 734 store software modules that provide functionality when executed by processors 712, 722, and 732, respectively. The modules may include, for example, an operating system that provides operating system functionality for apparatuses 710, 720, and/or 730. The memory may also store one or more functional modules, such as an application or program, to provide additional functionality for apparatuses 710, 720, and/or 730. The components of apparatuses 710, 720, and/or 730 may be implemented in hardware, or as any suitable combination of hardware and software. According to certain example embodiments, apparatuses 710, 720, and/or 730 may optionally be configured to communicate with each other via one or more wireless or wired communications links 750, 760, and/or 770 according to any radio access technology, such as NR.

According to certain example embodiments, processors 712, 722, and 732, and memory 714, 724, and 734 may be included in or may form a part of processing circuitry or control circuitry. In addition, in some example embodiments, transceivers 716, 726, and 736 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatuses 710, 720, and/or 730) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatuses 710, 720, and/or 730), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary:

| | |
|---|---|
| 3GPP | 3rd Generation Partnership Project |
| 5G | 5th Generation |
| CBR | Channel Busy Ratio |
| E-UTRAN | Evolved UTRAN |
| EMBB | Enhanced Mobile Broadband |
| gNB | 5G or Next Generation NodeB |
| IUC | Inter-UE Coordination |
| L2 | Layer 2 |
| LTE | Long Term Evolution |
| NR | New Radio |
| OFDM | Orthogonal Frequency Division Multiplexing |
| RAT | Radio Access Technology |
| RedCap | Reduced capability NR |
| RSRP | Reference Signal Received Power |
| RSU | Road Side Unit |
| RSW | Resource Selection Window |
| SL | Sidelink |
| SL-DRX | Sidelink Discontinuous Reception |
| TB | Transport Block |
| UE | User Equipment |
| URLLC | Ultra Reliable Low Latency Communication |

We claim:

1. An apparatus, comprising:

at least one processor; and at least one memory storing instructions that, when executed by the at least one processor, cause the apparatus at least to:

receive, from a first device, a request for inter-user equipment coordination, causing an inter-user equipment coordination (IUC) timer to set a time-period for a response, the IUC timer is set by a side link latency bound inter-UE-coordination (sl-Latency-BoundIUC) report ranging from 3 to 160 slots;

determine at least one second device to which to forward the request, wherein determining the at least one second device is based on:

a distance between the apparatus and the at least one second device;

a mobility of the apparatus relative to the at least one second device;

one or more capabilities of the at least one second device;

a type of the at least one second device;

a similarity in an interference situation of the apparatus and the at least one second device;

a communication state between the apparatus and the at least one second device;

explicit consent from the at least one second device to receive requests from the apparatus; and an explicit recommendation of the at least one second device to the apparatus from another device;

after expiry of the IUC timer, modify the request and forward the modified request to the at least one second device for the second device to provide a response to the request to the first device, the request being modified by an indication related to the forwarding to the at least one second device, wherein the indication comprises:

transmission information indicating identifiers of the apparatus and the first device;

information indicating an inability of the apparatus to provide the response to the request from the first device; and information indicating that the modified request was forwarded from the apparatus to the at least one second device; and determine to change a cast transmission type of the request to be forwarded, the cast transmission type comprising one of unicast, groupcast, or broadcast, wherein the forwarding of the modified request uses the changed cast transmission type, which is different than the cast transmission type used to transmit the request from the first device, and wherein the modified request when forwarded by groupcast or broadcast is restricted to recipients within a configurable range, the configurable range is a distance between the at least one second device and the first device.

* * * * *